United States Patent Office 2,813,132
Patented Nov. 12, 1957

2,813,132

3-(SUBSTITUTED-PHENYL)-1,1,3,3-TETRA-CHLORO-2-METHYLPROPENES

Donald G. Kundiger and Huey Pledger, Jr., Manhattan, Kans., assignors to The Dow Chemical Company, Midland, Mich., a corporation of Delaware No Drawing. Application September 3, 1953, Serial No. 378,408

6 Claims. (Cl. 260—651)

This invention is directed to 3-(substituted-phenyl)-1,1,3,3-tetrachloro-2-methylpropenes of the formula

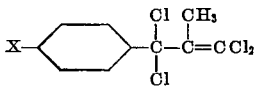

wherein X represents chlorine, bromine or a lower alkyl radical such as methyl, isopropyl, tertiarybutyl, or secondary amyl, and a method for their preparation.

The new compounds are liquids or low melting solids, substantially insoluble in water and soluble in most organic solvents. They have been found useful as active toxic ingredients of parasiticide compositions and particularly in compositions for the control of house flies and spider mites.

The 3 - (substituted - phenyl) - 1,1,3,3 - tetrachloro-2-methylpropenes may be prepared by reacting chlorine with a 3 - (substituted - phenyl) - 1,1 - dichloro-2-methylpropene of the formula

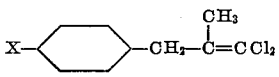

wherein X has the significance previously given. Generally, about 2 moles of chlorine are employed per mole of the propene reactant and the reaction is carried out under the influence of ultra-violet light.

In one method of preparing the compounds of the invention, the 3 - (substituted - phenyl) - 1,1 - dichloro-2-methylpropene is placed in a reaction vessel and gaseous chlorine is added thereto portionwise with stirring while the reaction mixture is exposed to ultra-violet light. The reaction is initiated readily and proceeds with the evolution of hydrogen chloride.

The reaction is conveniently carried out in a solvent such as carbon tetrachloride or other suitable volatile halo-hydrocarbon. In such operation, the reaction may be carried out at the reflux temperature of the solvent in a vessel equipped with a reflux condenser. The desired 3 - (substituted - phenyl) - 1,1,3,3 - tetrachloro-2-methylpropene may be separated from the crude reaction product and purified by conventional procedures, e. g. distillation, washing, or recrystallization.

If desired, a small amount of iodine may be employed in the reaction mixture as catalyst.

In a representative operation, 94.2 grams (0.5 mole) of freshly distilled 3-(para-chlorophenyl)-1,1-dichloro-2-methylpropene and 0.5 grams (0.004 mole) of iodine were dissolved in 210 milliliters of carbon tetrachloride and irradiated with an ultra-violet lamp. Chlorine was then passed into the solution through a tube dipping below the surface of the liquid, the reaction mixture being stirred constantly by a mechanical stirrer during the chlorine addition. Heat resulting from the exothermic nature of the reaction and from the absorption of radiant energy from the ultra-violet lamp raised the temperature of the reaction mixture to about 78° C. The mixture was maintained at this temperature under reflux and the introduction of chlorine continued for a period of time to complete the reaction. The crude reaction product was then washed with water, dried, and fractionally distilled to obtain a 3-(para - chlorophenyl)-1,1,3,3-tetrachloro-2-methylpropene product boiling at 119.5°–121.5° C. at 0.2 millimeters pressure and having a refractive index (n/D) of 1.5712 at 20° C. The 3-(para-chlorophenyl)-1,1,3,3-tetrachloro-2-methylpropene product had a density of 1.4716 at 20° C. and a chlorine content by analysis of 58.1 percent by weight as compared to 58.2 percent calculated for $C_{10}H_7Cl_5$.

In similar operations, 3-(para-bromophenyl)-1,1-dichloro - 2 - methylpropene and 3-(para-tolyl)-1,1-dichloro-2-methylpropene are reacted with chlorine while exposed to ultra-violet light to produce 3-(para-bromophenyl) - 1,1,3,3 - tetrachloro - 2 - methylpropene and 3 - (para - tolyl) - 1,1,3,3 - tetrachloro-2-methylpropene, respectively.

Representative 3-(substituted - phenyl) - 1,1 - dichloro-2-methylpropene starting materials employed in the preparation of the compounds of the present invention are oily liquids characterized by the following physical properties:

| Compound | Boiling Point, ° C. | Pressure in Millimeters |
|---|---|---|
| 3 - (para - chlorophenyl) - 1,1 - dichloro - 2 - methylpropene | 91.3–94 | 0.65 |
| 3 - para - bromophenyl) - 1,1 - dichloro - 2 - methylpropene | 100–111 | 0.9 |
| 3 - (para - tolyl) - 1,1 - dichloro - 2 - methylpropene | 60–60.3 | 0.1 |

The above and related compounds may be prepared by the method of our copending application Serial No. 294,266, filed June 18, 1952, now abandoned. In such method, one mole of a compound of the formula

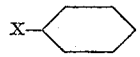

wherein X has the aforementioned significance, is reacted with one mole of 1,1,3-trichloro-2-methyl-1-propene in the presence of a catalytic amount of anhydrous aluminum chloride to produce the desired starting materials having the formula

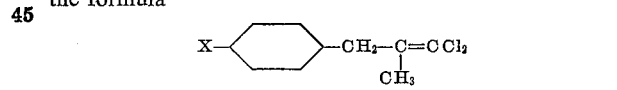

The 3-(halo-phenyl) compounds are claimed as new compounds in our copending application Serial No. 294,265, filed June 18, 1952, now Patent No. 2,745,884.

A composition comprising 3 - (para - chlorophenyl)-1,1,3,3-tetrachloro-2-methylpropene combined with a surface-active dispersing agent and an inert diluent was dispersed in water to prepare an aqueous spray dispersion containing 0.35 gram of the substituted propene compound per 100 milliliters of spray. This dispersion was applied to the foliage of lima bean plants heavily infested with strawberry spider mite (*Tetranychus atlanticus*). Counts made 3 days after the treatment showed that 70 percent of the mites on the treated plants had been killed.

We claim:

1. The 3-(substituted-phenyl) - 1,1,3,3 - tetrachloro-2-methylpropenes having the formula

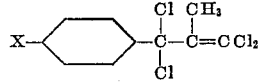

wherein X represents a member of the group consisting of chlorine, bromine and a methyl radical.

2. 3-(para - chlorophenyl) - 1,1,3,3 - tetrachloro-2-methylpropene.

3. 3-(para - bromophenyl) - 1,1,3,3 - tetrachloro-2-methylpropene.

4. 3-(para-tolyl)-1,1,3,3-tetrachloro-2-methylpropene.

5. A method for the preparation of 3-(substituted-phenyl) - 1,1,3,3 - tetrachloro - 2 - methylpropenes having the formula

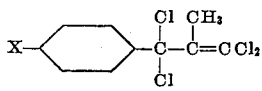

wherein X represents a member of the group consisting of chlorine, bromine and a methyl radical, which comprises the step of reacting chlorine with a 3-(substituted-phenyl)-1,1-dichloro-2-methylpropene of the formula

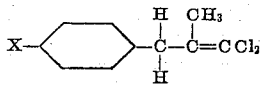

wherein X has the aforesaid significance, the reaction being carried out by introducing the chlorine into the liquid phase reaction mixture while irradiating the reaction mixture with ultra-violet light.

6. A method according to claim 5 wherein the reaction is carried out at a temperature below about 80° C.

References Cited in the file of this patent

FOREIGN PATENTS 478,084   Germany _____ June 20, 1929

OTHER REFERENCES

Price et al.: "Journal Org. Chem.," volume 8, pages 532 to 535 (1943).